March 16, 1943. A. FRIED 2,314,084
TOOL FOR CHAMFERING, RECESSING AND THE LIKE
Filed Aug. 6, 1941
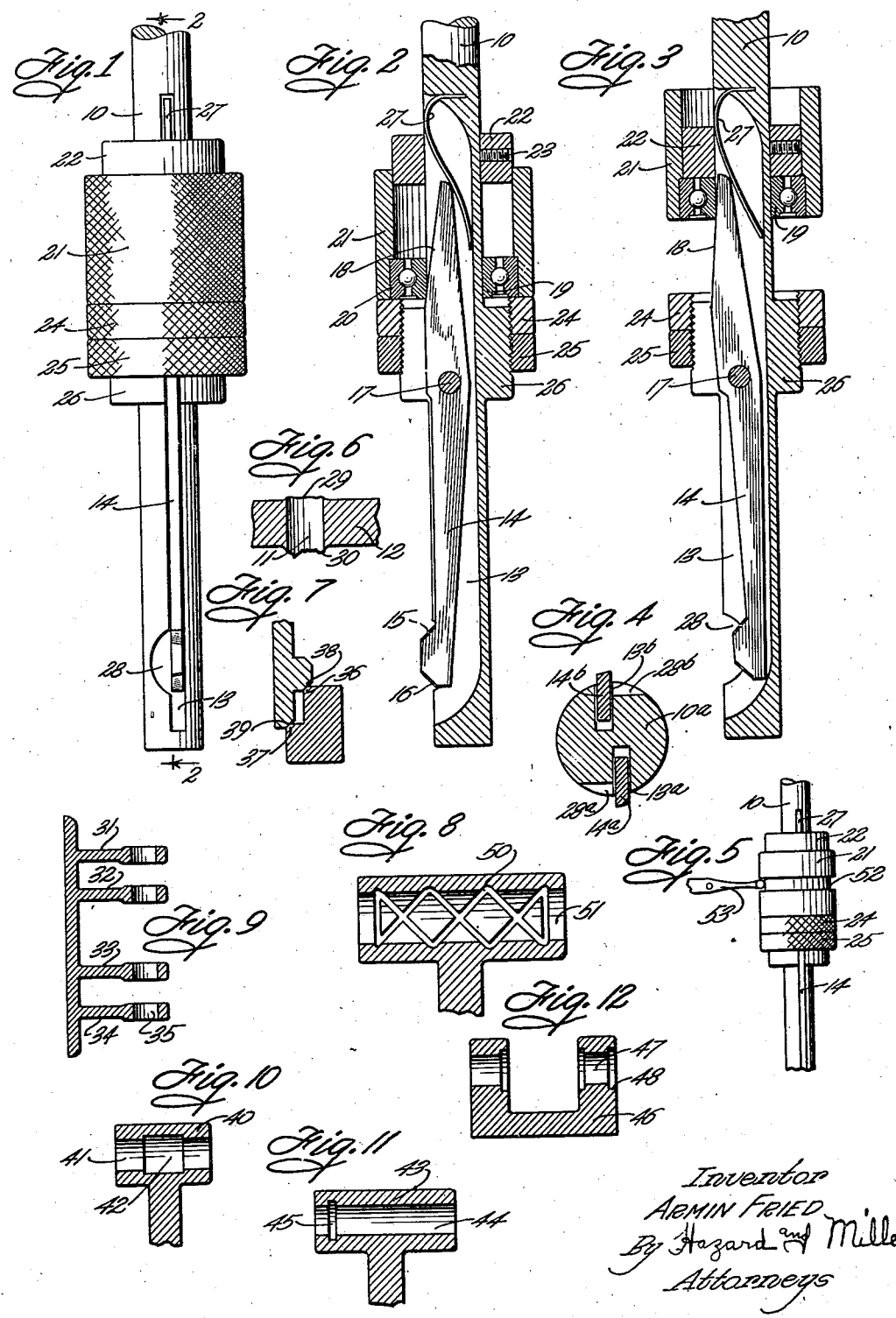
Inventor
ARMIN FRIED
By Hazard and Miller
Attorneys Patented Mar. 16, 1943

2,314,084

UNITED STATES PATENT OFFICE 2,314,084

TOOL FOR CHAMFERING, RECESSING, AND THE LIKE

Armin Fried, Los Angeles, Calif.

Application August 6, 1941, Serial No. 405,679

8 Claims. (Cl. 77—73.5)

This invention relates to a tool that may be advantageously used for burring, chamfering, recessing, and the like.

In drilling in metals, plastics, and like materials, the drill creates sharp burrs and projections at the surfaces where the drill enters the material and where it breaks through on the other side. These burrs are objectionable, and ordinarily must be removed to permit of assembly of related parts. The removal of these burrs at the edges of holes in flat plates or single wall structures now is generally accomplished by a burring tool somewhat similar in form to a counter-sinking tool which can be used to remove the burr or to chamfer the upper side of the work in which the drilled hole is formed. Where the work is very heavy or cannot be conveniently turned upside down to remove the burr on the opposite end of the drilled hole then the burr must be removed by hand which frequently is awkward and laborious process. Where the drilled hole extends through two or more walls or flanges which are closely related, such a counter-sinking tool cannot be used to remove the burrs on opposed surfaces of the walls.

An object of the present invention is to provide a tool which can be very efficiently used to remove the burrs or to perform chamfering operations on opposite sides of a wall through which a hole has been drilled, and if the work has a plurality of closely related walls through which the drilled hole extends, the tool may be used to consecutively remove the burr or to chamfer on opposite sides of all walls.

More specifically, an object of the invention is to provide a tool useful for performing burring, chamfering, and recessing operations consisting of a cylindrical shaft designed to substantially fit a previously formed hole in the work and which has a retractable and projectable cutter that can be optionally completely retracted within the circumference of the shaft or projected therefrom into cutting position. By this means the cutter may be advanced into cutting position on the upper or obverse side of a piece of work through which a hole has been drilled to remove the burr at the top of the hole, then the cutter may be retracted and the tool lowered to a position wherein the cutter may be projected and assume a position adjacent the lower end of the hole to remove the lower burr. If the work has a plurality of walls through which the drilled hole extends the cutter may be consecutively retracted and projected adjacent the upper and lower sides of each wall so as to conveniently and quickly perform the burring or chamfering operations.

Another object of the invention is to provide a tool which is useful not only for removing burrs and performing chamfering operation but which may also be utilized for recessing or enlarging the interior diameter of a previously formed hole and which may be utilized for cutting helical oil grooves and the like.

Another object of the invention is to provide a tool which is so constructed that the cutter may be quickly moved from retracted to projected position and vice versa without requiring the stopping of the rotation of the tool.

With the foregoing and other objects in view, which will be made manifest in the following detailed description and specifically pointed out in the appended claims, reference is had to the accompanying drawing for an illustrative embodiment of the invention, wherein:

Figure 1 is a view in front elevation of a tool embodying the present invention;

Fig. 2 is a vertical section taken through the tool illustrating the cutter in projected position;

Fig. 3 is a view similar to Fig. 2, illustrating the cutter as having been shifted into its retracted position;

Fig. 4 is a horizontal section through a slightly modified form of construction;

Fig. 5 is a partial view in front elevation illustrating a slightly modified form of construction for effecting the projection and retraction of the cutter;

Fig. 6 is a horizontal section through a plate in which there has been formed a hole, the burr of which may be removed by the tool embodying the present invention;

Fig. 7 is a sectional view illustrating a slightly modified form of cutter and illustrating a double burring or chamfering operation being performed thereby;

Fig. 8 is a sectional view illustrating the manner in which the improved tool may be utilized to form helical lubricant grooves;

Fig. 9 is a sectional view illustrating a machined part having a plurality of closely related walls which may be chamfered or burred by means of the improved tool; and Figs. 10, 11, and 12 are sectional views illustrating how recessing operations may be performed by the improved tool.

Referring to the accompanying drawing wherein similar reference characters designate similar parts throughout, the tool embodying the present invention comprises a cylindrical shaft 10 of suitable length having its upper end, not shown, shaped in any desirable manner that will enable its being mounted either in a drill press or in a lathe. The cylindrical shaft 10 is of a diameter to closely fit a previously formed hole, such as for example the drilled hole 11 in a plate 12 as shown in Fig. 6. A groove 13 is formed in the shaft 10 to extend longitudinally therein parallel to and just behind a diameter of the shaft, as clearly illustrated in Fig. 1. In this groove there is disposed a cutter 14 having in the form illustrated in Figs. 1 to 3 upper and lower cutting edges 15 and 16. The cutter 14 is in the form of a lever pivotally mounted in the groove on a removable pivot pin 17. The upper end of the cutter is provided with a tapered or cam edge 18 engageable by the inner race 19 of a ball bearing. The outer race of the ball bearing indicated at 20, is pressed into or is otherwise secured in a collar 21, the exterior surface of which may be knurled. The collar 21 is rotatable and is longitudinally slidable on the shaft. Upward movement of the collar is limited by the ball bearing engaging a stop collar 22 which is fastened onto the shaft by means of a set screw 23. Downward movement of the collar 21 may be limited by an adjustable stop formed by two jamb nuts 24 and 25, the exteriors of which may be knurled. These jamb nuts are screwed onto a threaded enlargement 26 on the shaft and may be adjusted to any desired position to limit the downward movement of the collar 21. A spring 27 has one end anchored in the top of groove 13 and engages the upper end of cutter 14 normally urging the upper end of the cutter outwardly or into the position shown in Fig. 3, wherein the lower end of the cutter equipped with the cutting edges 15 and 16 is completely retracted into the shaft so that no portion thereof projects beyond its circumference. Adjacent the cutting edges 15 and 16 the shaft is equipped with a small recess or chip throat 28.

The operation and advantages of the tool are as follows. If plate 12, see Fig. 6, has had a hole 11 drilled therethrough there is usually a small burr 29 where the drill entered the plate and on the underside there is frequently a burr 30 where the drill broke through the plate. In order to remove these burrs the tool may be mounted in a drill press or lathe or any revolving spindle and the lower end of the tool inserted in the previously formed hole 11. Collar 21 is then forced downwardly camming the edge 18 and projecting the cutter. The tool may then be lowered by the drill press to cause the cutting edge 16 to engage and remove the butt 29 or to chamfer the upper end of hole 11. When this operation is completed collar 21 is lifted causing the cutter to be completely retracted as shown in Fig. 3. The shaft 10 may then be lowered so as to pass the bottom of the cutter through hole 11. The cutter may then be projected and the shaft lifted to cause cutting edge 15 to remove or chamfer the lower burr 30.

If the work has a plurality of closely related walls, as those indicated at 31, 32, 33, and 34 on Fig. 9 through which a hole 35 extends, the same type of operation may be performed on each of the walls consecutively. Thus it will be noted that although adjacent walls, such as 31 and 32, are quite close together, nevertheless the burring or chamfering operations can be quickly and consecutively performed on opposite sides of these walls.

If the work has double edges such as is illustrated in Fig. 7, indicated by reference characters 36 and 37, the cutter may be equipped with corresponding cutting edges 38 and 39 to remove the burrs on these edges or to chamfer both edges simultaneously.

In Fig. 10 there is illustrated a piece of work 40 having a previously formed hole 41 that it is desired to enlarge or recess. To perform this operation the shaft of the tool is inserted in the hole 41 and when the cutter has its cutting edge opposite the location of the recess 42 the cutter may be expanded or projected by the collar 21. The depth of cut may be limited by the position of the adjustable stop formed by the jamb nuts 24 and 25. Likewise, as shown in Fig. 11, the work 43 may have a drilled hole 44 therein and a narrow groove 45 cut therein in a similar manner. In Fig. 12, the work 46 has the hole 47 recessed in its ends as at 48, which operation is performed in a similar manner.

It will of course be understood that in cutting grooves of the character illustrated at 45 and in cutting recesses having right angle sides or shoulders, such as those indicated at 42 and 48, that the shape of the cutting edges 15 and 16 on the cutter will have to be modified from that shown in Figs. 2 and 3 so as to conform thereto.

By mounting the tool on a lathe helical grooves such as those indicated at 50 on Fig. 8, may be cut in the walls of a previously formed hole 51.

In the preferred form of construction there is but a single cutter 14, but if desired, the shaft 10a, see Fig. 4, may be equipped with two grooves 13a and 13b arranged parallel to and on opposite sides of a diameter through the shaft. Each of these grooves has disposed therein a pivotally mounted cutter 14a and 14b corresponding to the cutter 14. Chip throats 28a and 28b may be formed in the shaft adjacent each cutter. In this form of construction both cutters will be simultaneously projected from opposite sides of the shaft by the collar 21.

While the collar is normally raised and lowered by hand while the shaft 10 is spinning within it, the collar may be grooved as indicated at 52, see Fig. 5, and a shifting fork 53 may be employed which is operated by a treadle to effect a raising and lowering of the collar.

An important feature or advantage of the construction resides in the fact that the cutter can be projected and retracted with equal facility while the shaft is either revolving or while idle. The fact that the projection and retraction of the cutter can be accomplished without stopping the spindle motion or rotary motion of the shaft is of great importance in speedily accomplishing the operations for which the tool has been designed. The adjustable stop formed by the jamb nuts permits of a high degree of accuracy in boring or recessing operations. These stops when once adjusted will precisely limit the projecting movement of the cutter and will maintain the size of the bore or recess without variation and without readjustment during successive operations on successive pieces of work.

From the above-described construction it will be appreciated that the tool is of relatively simple yet highly durable design and may be very advantageously employed for performing burring and chamfering operations. Where the work has closely related walls or is such that one edge of a hole is not readily accessible this can nevertheless be readily chamfered by the tool by merely retracting the cutter into the shaft, passing it through the hole, and expanding or projecting the cutter on the underside of the hole. Other advantageous uses of the tool will be readily apparent to persons skilled in performing machining operations.

Various changes may be made in the details of construction without departing from the spirit or scope of the invention as defined by the appended claims.

I claim:

1. A device of the class described comprising a cylindrical shaft adapted to fit a previously formed hole, there being a longitudinal groove formed in the shaft, a cutter pivotally mounted therein adapted to have its cutting edges completely retracted within the circumference of the shaft or projected therefrom, the upper end of the cutter presenting a cam edge, spring means urging the cutter into retracted position, a collar rotatable and longitudinally movable on the shaft engageable with the cam edge to advance the cutter, and means providing stops on the shaft limiting longitudinal movement of the collar, one of said stops being provided by a pair of jamb nuts threaded onto the shaft.

2. A device of the class described comprising a cylindrical shaft adapted to fit a previously formed hole, a cutter recessed in the shaft adapted to assume a position completely retracted therein or be projected therefrom, a collar rotatable and longitudinally adjustable on the shaft, said collar having an anti-friction bearing, the inner race of which fits about the shaft and is engageable with the cutter whereby upon longitudinal movement of the collar relative to the shaft, the cutter will be caused to project from the shaft.

3. A device of the class described comprising a cylindrical shaft adapted to fit a previously formed hole, a cutter recessed in the shaft adapted to assume a position completely retracted therein or be projected therefrom, said cutter being pivotally mounted intermediate its ends and presenting a cam edge, a collar rotatable and longitudinally adjustable on the shaft, said collar having an anti-friction bearing, the inner race of which fits about the shaft and is engageable with the cam edge whereby upon longitudinal movement of the collar the cutter may be projected from the shaft.

4. A device of the class described comprising a cylindrical shaft adapted to fit a previously formed hole, a cutter recessed in the shaft adapted to assume a position completely retracted therein or be projected therefrom, said cutter being pivotally mounted intermediate its ends and presenting a cam edge, a collar rotatable and longitudinally adjustable on the shaft, said collar having an anti-friction bearing, the inner race of which fits about the shaft and is engageable with the cam edge whereby upon longitudinal movement of the collar the cutter may be projected from the shaft, and spring means urging the cutter into a position retracted within the shaft.

5. A device of the class described comprising a cylindrical shaft adapted to fit a previously formed hole, a cutter recessed in the shaft, said cutter being pivotally mounted upon the shaft intermediate its ends, the end of the cutter above the pivot presenting a cam surface, said cutter below the pivot presenting a cutting edge capable of being advanced beyond the sides of the shaft or retracted therein, a collar rotatable and longitudinally slidable upon the shaft cooperating with the cam surface to bring about advancement or retraction of the cutting edge, and means providing stops on the shaft above the pivot for limiting movements of the collar, one of the stops by limiting the movement of the collar serving to limit the extent to which the cutting edge is advanced.

6. A device of the class described comprising a cylindrical shaft adapted to fit a previously formed hole, a cutter recessed in the shaft, said cutter being pivotally mounted upon the shaft intermediate its ends, the end of the cutter above the pivot presenting a cam surface, said cutter below the pivot presenting a cutting edge capable of being advanced beyond the sides of the shaft or retracted therein, a collar rotatable and longitudinally slidable upon the shaft cooperating with the cam surface to bring about advancement or retraction of the cutting edge, an anti-friction bearing within the collar having an inner race fitting about the shaft engageable with said cam surface, means providing a lower stop limiting downward movement of the collar, and means providing an upper stop engageable by the anti-friction bearing limiting upward movement of the collar.

7. A device of the class described comprising a cylindrical shaft adapted to fit a previously formed hole, a cutter recessed in the shaft, said cutter being pivotally mounted upon the shaft intermediate its ends, the end of the cutter above the pivot presenting a cam surface, said cutter below the pivot presenting a cutting edge capable of being advanced beyond the sides of the shaft or retracted therein, a collar rotatable and longitudinally slidable upon the shaft cooperating with the cam surface to bring about advancement or retraction of the cutting edge, an anti-friction bearing within the collar engageable with said cam surface, an upper stop on the shaft over which the top of the collar may telescope serving to limit upward movement of the collar, and means limiting downward movement of the collar.

8. A device of the class described comprising a cylindrical shaft adapted to fit a previously formed hole, there being an enlargement on the shaft, a recess formed in the shaft and through the enlargement, a cutter disposed in the recess, said cutter being pivotally mounted upon the shaft intermediate its ends, the end of the cutter above the pivot presenting a cam surface above the enlargement, said cutter below the pivot presenting a cutting edge capable of being advanced beyond the sides of the shaft or retracted therein, a collar rotatable and longitudinally slidable upon the shaft above the enlargement cooperating with the cam surface to bring about advancement or retraction of the cutting edge, means providing an adjustable stop on the enlargement engageable by the collar to limit the extent to which the cutting edge is advanced by the collar, and stop means on the shaft above the enlargement engageable by the collar limiting movement of the collar in that direction which permits the cutter to be retracted, and spring means urging the cutter into its retracted position.

ARMIN FRIED.